April 14, 1936.  F. A. PARSONS  2,037,262
TRANSMISSION MECHANISM
Filed May 24, 1928   2 Sheets-Sheet 1
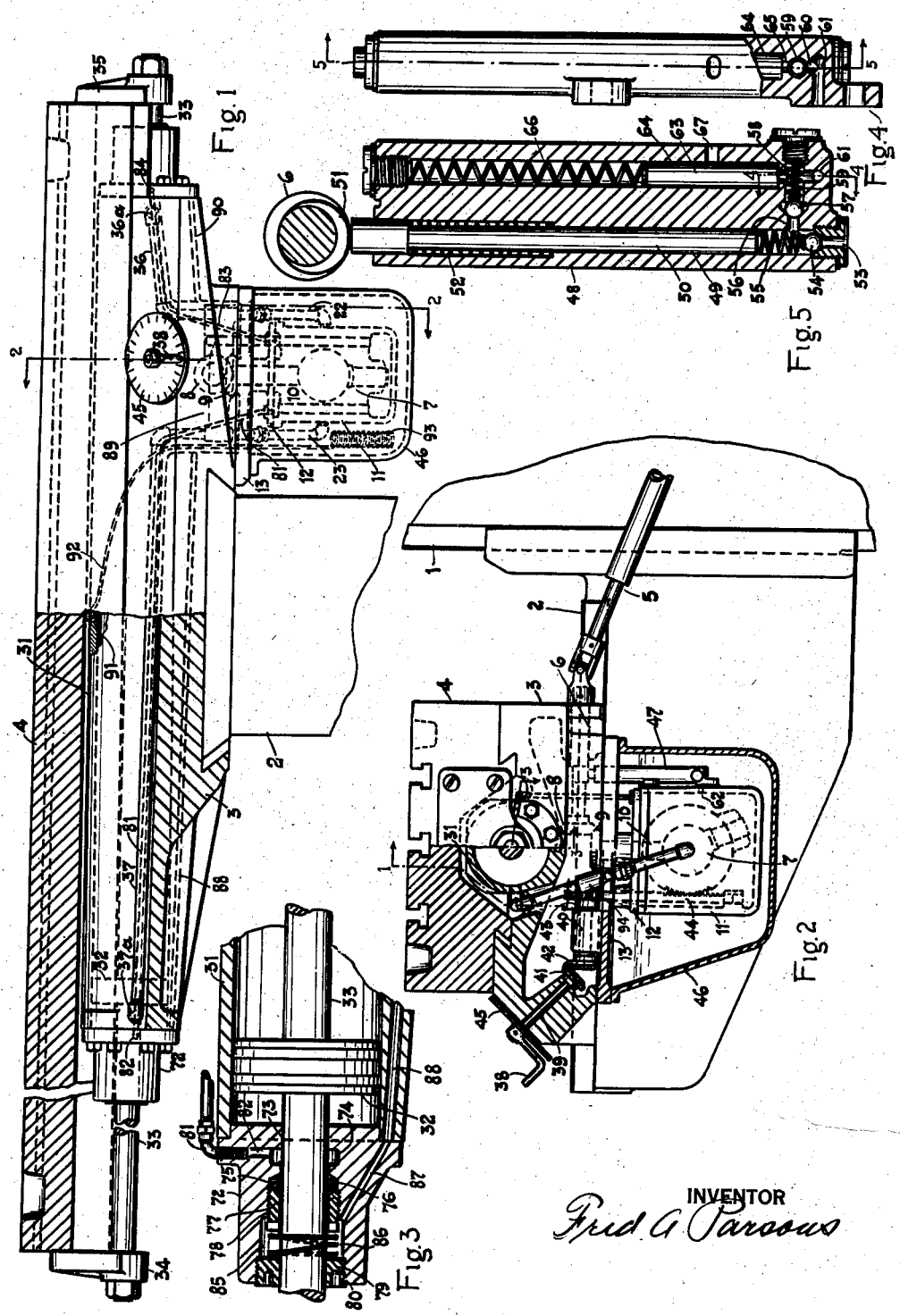
INVENTOR
Fred G. Parsons

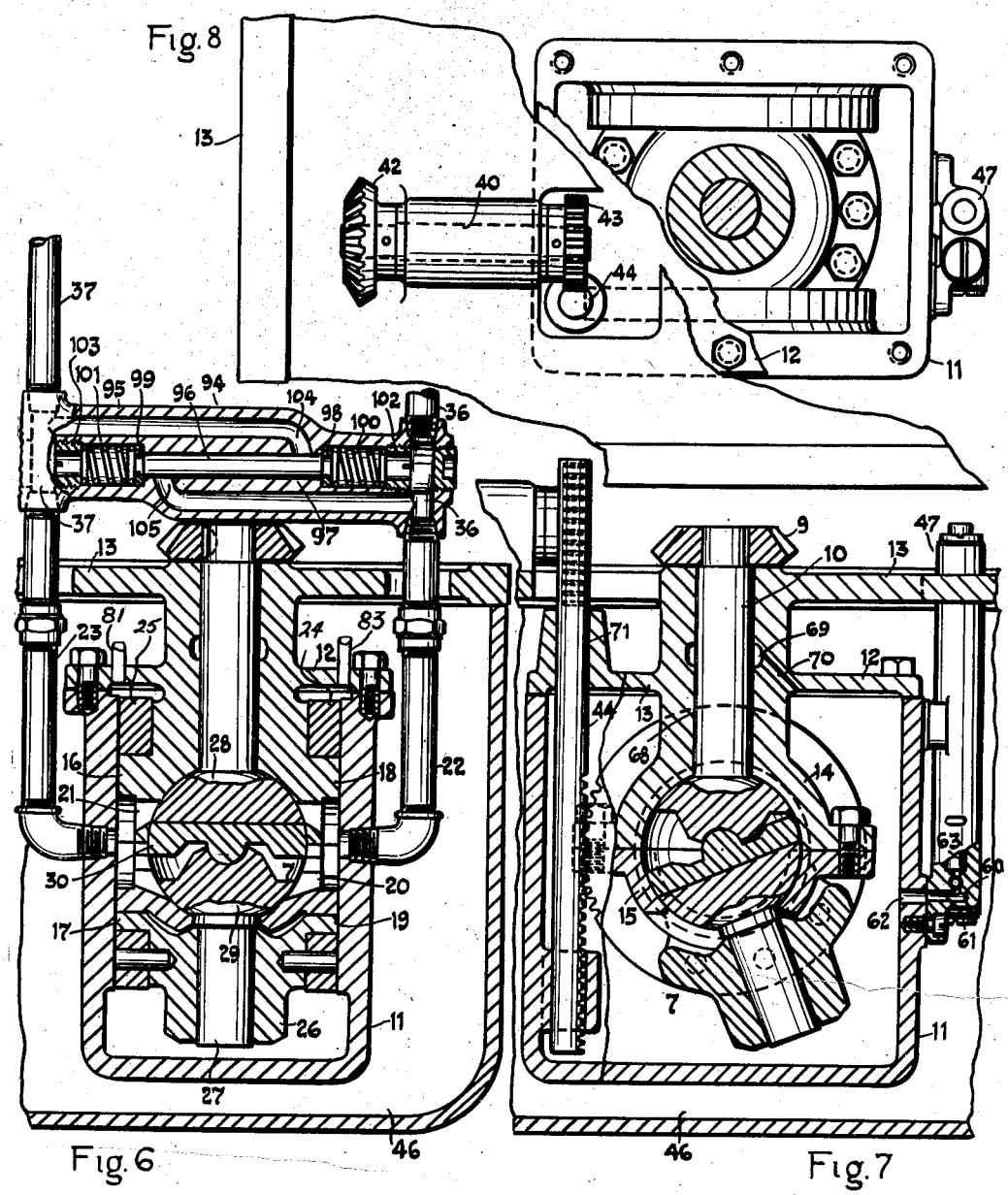

Patented Apr. 14, 1936

2,037,262

UNITED STATES PATENT OFFICE 2,037,262

TRANSMISSION MECHANISM

Fred A. Parsons, Milwaukee, Wis., assignor to Kearney & Trecker Corporation, West Allis, Wis.

Application May 24, 1928, Serial No. 280,133

7 Claims. (Cl. 60—52)

This invention relates to hydraulic transmissions and to such transmissions in combination for the movement of machine tool supports or similar purposes.

When a member or support to be moved always opposes the transmission which moves it there need be no provision to prevent the support from over-running or moving ahead of the transmission and a hydraulic transmission may be used in which the motor exhausts freely into an open reservoir and which may be called an open system. But in many instances, particularly for movement of the table of a milling machine, the conditions may be such that the table is sometimes thrust by other forces in the same direction as the transmission tends to move it, causing it to over-run, or forces may act to move the table when the transmission is disconnected. In a hydraulic transmission system, such undesired movements can be prevented by connecting pump and motor by closed channels such that the motor exhaust or outlet port is connected to the pump suction or inlet port. Such an arrangement may be called a closed system. The support can then move only in accordance with the movement of fluid by the pump, providing that the closed system is maintained completely filled by a substantially incompressible liquid such as oil. To accomplish this, it is necessary to provide against or compensate for leakage from the system.

It is an object of this invention to provide an improved closed hydraulic transmission.

Another object is to provide an improved combination of a closed hydraulic transmission with a machine tool.

Another object is to provide a closed hydraulic transmission having improved means compensating for or preventing leakage of fluid therefrom.

Other objects are to provide improved means for maintaining a relatively high pressure in all the fluid in a closed hydraulic system, and improved means for effecting such result under the conditions peculiar to the operation of machine tools.

Other objects are generally to simplify and improve the construction and operation of hydraulic transmissions and of machine tools, and of the combination thereof, and still other objects will be apparent from this specification.

The invention consists in the particular construction and combination of parts herein illustrated, described and claimed and in such modifications thereof as may be equivalent of the claims.

In the drawings the same parts are indicated by the same reference characters throughout.

Fig. 1 is a front elevation, partly in section, along line 1—1 of Fig. 2, of a portion of a milling machine incorporating the invention.

Fig. 2 is a right side elevation of the same portion of the same machine tool, partly in section along line 2—2 of Fig. 1.

Fig. 3 is an enlarged partial section through the left end portion of a piston and cylinder shown in Fig. 1, taken along line 3—3 of Fig. 2.

Fig. 4 is an enlarged side view of a pump shown in Fig. 2, partly in section along line 4—4 of Fig. 5.

Fig. 5 is a section along line 5—5 of Fig. 4.

Figs. 6 and 7 are enlarged sections of portions of the mechanism shown in Figs. 1 and 2, and particularly of the pump.

Fig. 8 is a top view of the mechanism shown in Fig. 7.

The machine tool is of a general type known as a knee and column milling machine having a stationary support or column 1, only a portion of which is shown. A knee or support 2 is guided on the face of column 1 for vertical movement relative thereto, and slidably guides a saddle or support 3 for cross movement toward and from the column. On saddle 3 a table or work support 4 is slidably guided for reciprocatory longitudinal movement transverse both to the cross and to the vertical movements. The various sliding guides may be of any of several well known constructions and will therefore not be described in detail. Means for movement of the knee and saddle may be similar to the means which will be described for table movement or any suitable means and is therefore not shown.

An extensible universal joint shaft of well known form generally denoted by the numeral 5, Fig. 2, is used to drive a shaft 6, journaled in saddle 3, the joint shaft being driven from any suitable power source, not shown, associated with the column 1. Shaft 6, drives a plurality of pumps. A variable delivery pump, generally denoted by the numeral 7, Figs. 1 and 2, is driven by the means of a bevel gear 8 fixed on shaft 6 and a gear 9 meshed therewith and fixed on the pump drive shaft 10, see also Figs. 6 and 7. Pump 7 may be of a variety of well known forms, but as here shown is of a construction similar to that fully shown and described in an application, Patent No. 1,678,050, issued July 24, 1928, and will therefore be only briefly described.

A substantially closed pump casing generally denoted by the numeral 11 provides a cover portion 12 fixed with a plate member 13 which is removably fixed on saddle 3. A pump housing portion 14 fixed with cover 12 extends within the casing 11 and removably fixed thereon is a pump housing member 15. Portions 16, 17, and 18, 19 of the housing members form trunnions through which ports or passages 20 and 21 open into opposite sides of a spherical chamber formed within the housing members 14—15 and having the center of the sphere complementary thereto coincident with the axis of shaft 10. The ports respectively communicate with suitable openings through the walls of casing 11 which in turn respectively communicate with pipes or channels 22 and 23 leading to the motor. The trunnions mentioned support ring members 24—25 fixed with a member 26, whereby rings 24—25 and member 26 form a unit supported and guided for movement about an axis passing through the center of the spherical chamber and at right angles to the axis of shaft 10. Journaled in member 26 is a shaft 27 having its axis of rotation at right angles to the axis upon which member 26 moves about the trunnion and passing through the center of the spherical chamber in any position of member 26. Fixed on shafts 10 and 27 respectively are members 28 and 29. An intermediate member 30 is pivoted both with member 28 and member 29, the respective pivots being at right angles to one another and each passing through the center of the spherical housing. Member 28, driven from shaft 10, drives the intermediate member 30 which in turn drives member 29 and shaft 27 and the arrangement is such as to form four separate substantially closed chambers within the spherical chamber each of which is alternately expanded and contracted during each revolution of the parts if member 26 is positioned for the axis of shaft 27 and member 29 to stand at an angle with the axis of shaft 10 and member 28. The amount of change in volume of each such chamber during a given revolution is proportional to the angle between such axes, being zero for a zero angle. The position and form of ports 20 and 21 and of the various parts is such that the several chambers each rotate to maintain communication with one port during expansion and with the other port during contraction whereby fluid supplied to the one port will be forcibly expelled from the other, thus creating a positive flow of fluid through the pump. As the shaft 27 and member 26 are bodily moved for their axes to stand to the one or the other side of the axis of shaft 10, the direction of the flow through the pump is reversed. Thus according to the position of member 26 about its trunnion the pump will deliver fluid under pressure at any volume of flow up to the maximum determined by the size of the pump and speed of shaft 10, and to either of the pipes or channels 22 or 23. When the member 26 is in its central position no fluid flows nor can any fluid be forced through the pump, the pump parts then effectually closing the passage through the pump, irrespective of whether the pump parts are rotating or stationary.

Fluid moved by pump 7 is used to move table 4 by the means of a suitable motor and transmission consisting in this case of a cylinder 31 having a piston 32 movable in the cylinder bore and connected to the table by the means of a piston rod 33 extending through the cylinder heads at each cylinder end and fixed at the respective rod ends with brackets 34—35 which are fixed with the table. The channels or pipes 22—23 are extended in the form of closed channels or pipes 36—37 respectively communicating with the cylinder bore at opposite cylinder ends and on opposite sides of the piston 32, through openings 36a and 37a.

The position of member 26 and shaft 27 is adjustable by the means of a hand lever 38, fixed on a shaft 39, a shaft 40 moved from shaft 39 through bevel segments 41—42, and a gear 43 fixed on shaft 40 and engaging suitable rack teeth in a rod or plunger 44 which also has suitable rack teeth engaging gear teeth cut in the periphery of one of the trunnion rings 24 within the pump casing. The position of lever 38 indicates the adjustment of member 26 against a graduated dial or chart 45 fixed on the saddle in a conveniently visible position.

The construction described constitutes a transmission for power movement of table 4 and including a closed circuit hydraulic transmission which, when power driven at a constant rate of shaft 10 may be adjusted to give any table rate within its capacity in either direction or a table stop, and with the table locked against undesired movements so long as the closed hydraulic system remains completely filled with suitable liquid such as oil.

Although the hydraulic system described is closed within the meaning previously explained, yet in all hydraulic transmissions there must exist points where leakage may take place into or out of the system.

In the present instance, the pump presents such points of possible leakage in the various sliding joints required to provide adjustment of the members for different delivery requirements, also around the rotating shaft 10 which delivers power to the pump, and also around the sliding pump adjusting rod 44. For each of these points fluid seals, under pressure, are provided as follows:

The construction of pump 7 and casing 11 is such that every point of possible leakage except the two last mentioned above is enclosed within the interior of the casing. The casing is initially filled with fluid, and although a certain amount of fluid is withdrawn therefrom during operation as will be described, means is provided to maintain the casing filled with fluid under pressure. A variety of means for this purpose may be used but in the present instance such means consists generally of a reservoir 46 containing a liquid, preferably of the same nature as used in the closed system, a supplementary power operated pump, generally denoted by the numeral 47, Fig. 2, and shown in detail in Figs. 4—5, which is adapted to force fluid from the reservoir 46 into casing 11, and means adapted to limit the pressure thus established within the casing 11 to a predetermined maximum.

Pump 47 may be of any suitable type but in this instance is a plunger pump as follows. A housing member 48 is fixed with casing 11 and provides a bore 49, Fig. 5, within which a plunger 50 is closely fitted. The upper end of the plunger is thrust against an eccentric portion 61 of shaft 6 by the means of a spring 52, whereby the plunger will reciprocate as shaft 6 revolves. Communicating with the lower end of bore 49 is an inlet valve consisting of an inlet passage 53 communicating with the fluid in reservoir 46, a ball 54, and a spring 55, whereby fluid is drawn from the reservoir 46 to the bore 49 during the up stroke of plunger 50 but is prevented from returning. Leading from the bore 49 is an outlet valve consisting of a passage or channel 56, a ball 57 and a spring 58, whereby fluid may move from the bore 49 to a passage 59 during the down stroke of plunger 50 but may not return to the bore. Passage 59 communicates with the interior of casing 11 through channels 60, 61 and 62 (Figs. 2—4—7). A plunger 63 moves in a bore 64 which communicates with the channel 59 through a channel 65, whereby the pressure set up by pump 47 tends to move the plunger 63 against the resistance of a spring 66. At a predetermined point of such movement, corresponding to a predetermined pressure of fluid in the casing 11, the plunger 63 opens bore 64 to an outlet passage 67, whereby fluid in excess of that required to maintain a predetermined pressure within casing 11 is returned to the reservoir 46.

The movement of plunger 63 in the bore 64 provides in effect an accumulator of capacity greater than the volume of fluid delivered by plunger 50, whereby such accumulator prevents pulsations or loss of pressure in casing 11 during the suction stroke of plunger 50.

It will be obvious that so long as a pressure is maintained in casing 11 there are no leakage points in the closed system except such as are provided with liquid seals.

To seal the closed system at the point where shaft 10 passes into the casing 11, the following construction is provided. Shaft 10 is journaled in a relatively long and closely fitted bearing or bore 68 (Fig. 7). At the inner end such bore communicates with the spherical chamber within the pump housing. At an intermediate point an annular space or groove 69 is provided which communicates with the interior of casing 11 thru a channel 70, whereby sealing fluid will fill groove 69. The clearance between bore 68 and shaft 10 being relatively very small will create a resistance against leakage from the groove 69. Such fluid as does work outwardly will lubricate the shaft and gear and any excess will return to the reservoir 46.

At the point where rod 44 passes out of the casing 11, the rod is closely fitted in a relatively long bore 71, Fig. 7. The close fitting presents a relatively great resistance to the passage of fluid along the rod whereby very little fluid will escape from the casing 11 by such path, not sufficient to prevent the pump 47 from maintaining the required fluid pressure within the casing.

At the motor there are points of possible leakage in the closed system at each end of the cylinder where the piston rod 33 passes through the end walls to be attached to the table 4. Since these points are similar in construction and in the means taken to seal the closed system, only the construction at the left end of the cylinder (Figs. 1 and 3) will be described.

The cylinder is provided with a removable cap or head member 72 having a bore 73 closely fitted for the piston rod 33 to slide therethrough. At an intermediate point of such bore there is provided an annular groove or channel 74 and at a point farther removed from the cylinder an enlarged portion 75 containing packing 76 which is compressed around the rod by suitably rotating a sleeve member 77 engaging a threaded bore portion 78. At a point still further removed from the cylinder the bore, together with a sleeve 79 removably fixed at the outer end thereof and having a bore 80 through which the piston rod passes, form a chamber 85. Fluid pressure from pump 47 is applied to the annular chamber 74 through a pipe or channel 81, Figs. 1 and 3, which for convenience takes its fluid from the interior of the casing 11, such fluid entering chamber 74 through an opening 82. A similar construction at the other end of the cylinder derives fluid pressure from pump 47 through a pipe or channel 83, Fig. 1, opening into the casing 11 at one end and at the other end into a similar annular chamber through an opening 84. The packing 76 presents a relatively great resistance to escape of fluid from the annular chamber along the rod to chamber 85. Such fluid as may escape into chamber 85 is scraped from the rod by a scraper member 86 which is in the nature of a coiled spring having a bore slightly smaller than the diameter of the piston rod, whereby it is maintained in close scraping contact therewith when sprung over the rod. When so constructed no fluid can pass along the rod past member 86 and during rod movement outwardly from the cylinder the fluid which may be on the rod is scraped off. Thus no fluid can pass along the rod out of chamber 85 and such fluid as enters the chamber along the rod drops into the chamber 85 by gravity. A drain passage 87 out of chamber 85 communicates with a passage or channel 88 in saddle 3 and returns the fluid to the reservoir 46 through an opening 89 in the saddle near above the reservoir. Similarly a channel 90 returns fluid from the other end of the cylinder to the reservoir.

It will be seen that at each of the possible points of leakage into or out of the closed table operating system the system is completely sealed by a body of fluid under pressure. Both systems are preferably filled with similar liquid such as oil, which may leak from the sealing system to a certain very limited extent, but such leakage is all collected and returned to the reservoir 46 by gravity and automatically returned to the sealing system by the pump 47 whereby pressure is automatically maintained. The points where leakage may occur from the sealing system are by the construction disclosed, reduced to only such openings as are necessary to introduce mechanical power into the hydraulic transmission, to take mechanical power out of the hydraulic transmission and to apply movement to a controller or regulating device for the hydraulic transmission. Such unavoidable leakage points are restricted to present a very great frictional resistance to the escape of fluid from the sealing system whereby leakage therefrom will be very small in quantity, and thus the pump 47 although operating at a relatively high pressure nevertheless requires very small power because of the small volume required. A communication exists between the closed table operating system and the closed sealing system whereby the table operating system will receive fluid from the sealing system until all portions of the table operating system acquire the pressure set up in the sealing system. Such communication exists through bore 69 along shaft 10, also through bore 73 along the piston rod 33, also from casing 11 into the pump through the sliding joints required for pump adjustment.

In the operation of the hydraulic transmission, gas may be generated from deterioration of its liquid which would be very objectionable because relatively very resilient. Means are therefore provided to drain gas from the closed table operating system. Such drain is preferably at the highest point of the system which in this case is the cylinder. At the top of the cylinder and at approximately the center of the stroke of piston 32 there is provided a vent 91 communicating with a pipe 92. Pipe 92 is relatively very long and of very small bore. For convenience the pipe is coiled at 93 within the reservoir 46. The long small bore of pipe 92 presents a very great resistance to the passage of oil or liquid, sufficient to maintain substantially the pressure of the leak preventing system throughout the table operation system, but a comparatively small resistance to the passage of gas or air. The outlet of pipe 92 is submerged in the oil of reservoir 46 whereby no air can under any conditions be drawn through the tube into the cylinder. The closed table operating system may be considered as two bodies of fluid substantially sealed away from one another by the piston 32 and the pump 7 but in each of which the pump 47 maintains substantially the pressure of the sealing system. The location of the vent 91 is such that during table operation it is alternately in communication with each such body of fluid as the piston reciprocates, and the pressure set up by pump 7 is sufficient to immediately force out any gas collected adjacent the vent after which the friction of the liquid in pipe 92 substantially seals the vent again. Since any gas in the system must eventually find its way to the one or the other side of the piston the system will be automatically maintained free of gas.

It is contemplated and may sometimes be preferable to provide two venting systems similar to the one just described, one vent then being located at each end of the cylinder whereby each side of the piston is continuously in communication with a vent in any piston position.

It is also contemplated that in many instances it will be preferable to provide a vent in the form of a valve or hand operated device instead of or in addition to the automatic vent just described.

It is also contemplated that devices (not shown) of well known form will be provided for originally filling the closed systems, and for draining the fluid therefrom.

In the operation of a machine tool, the table resistance may increase to a point in excess of that for which the machine was designed. In the machine here shown such excess or overload might damage the table transmission. To prevent this the table transmission includes a safety device or overload preventing means generally denoted by the numeral 94 (Figs. 2 and 6). In effect, the device prevents excess of pressure in either channel 36 or 37 leading to the cylinder, by by-passing the fluid whenever the pressure exceeds a predetermined amount. The construction is as follows: A fitting 95 contains a portion of channel 36 and also of channel 37. A plunger 96 is slidably fitted in a bore 97 in the fitting. Plunger 96 is retained by washers 98—99 and springs 100—101 in a manner to resist movement in either direction, the washers being seated in shouldered spring retaining bores to prevent one spring from balancing the other, whereby movement of the plunger to the left in Fig. 6 is opposed by washer 99 and spring 101, and movement to the right by washer 98 and spring 100. The springs are held under an initial pressure by the members 102—103 respectively, whereby no movement of the plunger takes place until the initial spring pressure is overcome. Fluid from channel 36 presses against the right hand end of plunger 96 and if the pressure exceeds the predetermined amount will move the plunger to the left thereby opening a by-pass channel 104 which leads to channel 37, whereby pump 7 is by-passed. Similarly an excess of pressure in channel 37 moves the plunger to the right and opens a channel 105 leading to channel 36, whereby pump 7 is by-passed.

Thus in either direction of operation of pump 7 the pump is by-passed if the resistance to table movement becomes greater than a predetermined amount, but without opening the closed system, since the system is merely by-passed within itself.

What is claimed is:

1. The combination with a closed hydraulic transmission system including different bodies of fluid separated by the movable elements of a pump and a motor, of means for preventing leakage from said system including a third body of fluid under a predetermined pressure, and means preventing the fluid pressure within said system from exceeding said predetermined pressure and including a by-pass operative at a pressure lower than said predetermined pressure and connecting said bodies of fluid within said system.

2. In a machine tool, the combination of a reciprocatory work table, a piston and cylinder for movement thereof, a pump adjustable for variable volume fluid delivery, channels respectively connecting the inlet and outlet sides of said pump with the different ends of said cylinder whereby to provide a table operating system, a reservoir, a second pump deriving fluid from said reservoir, channel means connecting said second pump with said table operating system to effect a continuous pressure operative to substantially compress the fluid on both sides of said piston, and means operative from the pressure of one of said pumps for automatic removal of gas from said table operating system.

3. In a machine tool, the combination of a reciprocatory work table, a piston and cylinder connected for movement thereof, a pump adjustable for variable volume fluid delivery, rate indicating means including a chart and movable in accordance with adjustment of said pump, channels respectively connecting the inlet and outlet sides of said pump with the different ends of said cylinder and constructed to substantially prevent outward leakage, whereby to provide a table operating system, a reservoir, and means operable during operation of said table for the supply of fluid from said reservoir to said system, whereby to prevent said table from overrunning.

4. In a machine tool, the combination of a reciprocatory work table, a piston and cylinder directly connected for movement thereof, a pump adjustable for variable volume fluid delivery, rate indicating means including a chart and movable in accordance with adjustment of said pump, channels respectively connecting the inlet and outlet sides of said pump with the different ends of said cylinder and constructed to substantially prevent outward leakage, whereby to provide a table operating system, a reservoir, a second pump deriving fluid from said reservoir, and channel means connecting said second pump with said table operating system, whereby to substantially compress the fluid on both sides of said table piston, and to prevent said table from overrunning.

5. In a machine tool, the combination of a reciprocatory work table, a piston and cylinder for movement thereof, a pump adjustable for variable volume fluid delivery, channels respectively connecting the inlet and outlet sides of said pump with the different ends of said cylinder and constructed to substantially prevent outward leakage, whereby to provide a table operating system, table reversing means associated with said system, a reservoir, means continuously operative during movement of said table for removal of gas from said table operating system, and means operative during movement of said table for the supply of fluid from said reservoir to said system, whereby to prevent said table from overrunning.

6. In a machine tool, the combination of a reciprocatory work table, a piston and cylinder directly connected for movement thereof, a pump adjustable for variable volume fluid delivery, rate indicating means including a chart and movable in accordance with adjustment of said pump, channels respectively connecting the inlet and outlet sides of said pump with the different ends of said cylinder and constructed to substantially prevent outward leakage, whereby to provide a table operating system, a table reversing means associated with said system, a reservoir, a second pump deriving fluid from said reservoir, and channel means connecting said second pump with said table operating system, whereby to substantially compress the fluid on both sides of said table piston and to prevent said table from overrunning.

7. In a machine tool, the combination of a reciprocatory support, a piston and cylinder connected for movement thereof, a pump adjustable for variable volume fluid delivery, rate indicating means including a chart and movable in accordance with adjustment of said pump, channels respectively connecting the inlet and outlet sides of said pump with the different ends of said cylinder and constructed to substantially prevent outward leakage, whereby to provide a table support operating system, a reverser for said support and associated with said system, means operative during support movement for removal of gas from said system, a reservoir, and means operative during movement of said support for the supply of fluid from said reservoir to said system, whereby to prevent said table from overrunning.

FRED A. PARSONS.